United States Patent
Naoi et al.

(10) Patent No.: US 9,637,844 B2
(45) Date of Patent: May 2, 2017

(54) STEEL CORD FOR RUBBER ARTICLE REINFORCEMENT AND PNEUMATIC RADIAL TIRE USING SAME

(75) Inventors: Koichi Naoi, Tokyo (JP); Hiroyuki Matsuo, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 550 days.

(21) Appl. No.: 14/004,473

(22) PCT Filed: Mar. 23, 2012

(86) PCT No.: PCT/JP2012/057650
§ 371 (c)(1),
(2), (4) Date: Sep. 11, 2013

(87) PCT Pub. No.: WO2012/128372
PCT Pub. Date: Sep. 27, 2012

(65) Prior Publication Data
US 2014/0000779 A1    Jan. 2, 2014

(30) Foreign Application Priority Data

Mar. 24, 2011    (JP) .................................. 2011-066739
Mar. 23, 2012    (JP) .................................. 2012-068456

(51) Int. Cl.
*D02G 3/48*  (2006.01)
*B60C 9/00*  (2006.01)
(Continued)

(52) U.S. Cl.
CPC .............. *D02G 3/48* (2013.01); *B60C 9/0007* (2013.04); *B60C 9/0057* (2013.04); *B60C 9/18* (2013.01);
(Continued)

(58) Field of Classification Search
CPC ....... B60C 9/0057; B60C 9/0007; B60C 9/18; B60C 9/185; B60C 2009/0092;
(Continued)

(56) References Cited

U.S. PATENT DOCUMENTS

2010/0005774 A1    1/2010 Fukuda

FOREIGN PATENT DOCUMENTS

EP    0 781 883 A1    7/1997
EP    1 760 190 A1    3/2007
(Continued)

OTHER PUBLICATIONS

Machine translation of JP2003-291608 (no date).*
(Continued)

*Primary Examiner* — Michael H Wilson
*Assistant Examiner* — Philip N Schwartz
(74) *Attorney, Agent, or Firm* — Sughrue Mion, PLLC

(57) ABSTRACT

Provided is a steel cord for reinforcing rubber articles which, when applied to a belt of a tire, can attain lightweight without reducing the durability of the tire, and in particular, to a steel cord for reinforcing rubber articles in which the properties of a treat after rubberizing are excellent and a pneumatic radial tire using the same.

Also provided is a steel cord for reinforcing rubber articles comprising a core formed by arranging two core filaments 1 in parallel without being twisted together, and N ($2 \leq N \leq 4$) sheath filaments 2 which are twisted together around the core. Letting the diameter of the core filament 1 be d1, and the diameter of the sheath filament 2 be d2, d1>d2.

14 Claims, 2 Drawing Sheets

(51) Int. Cl.
  *D07B 1/06* (2006.01)
  *B60C 9/18* (2006.01)
  *B60C 9/20* (2006.01)

(52) U.S. Cl.
  CPC .............. *B60C 9/185* (2013.01); *D07B 1/062* (2013.01); *D07B 1/0646* (2013.01); *D07B 1/0653* (2013.01); *B60C 2009/1842* (2013.04); *B60C 2009/2067* (2013.04); *D07B 2201/2006* (2013.01); *D07B 2201/2029* (2013.01); *D07B 2201/2051* (2013.01); *D07B 2201/2065* (2013.01)

(58) Field of Classification Search
  CPC .... B60C 2009/2074; B60C 2009/2096; B60C 2009/0416; B60C 2009/0466; B60C 2009/1842; B60C 2009/2067; D02G 3/48; D02G 3/12; D07B 1/0646; D07B 1/0653; D07B 1/062; D07B 2801/12; D07B 2201/2065; D07B 2201/2051; D07B 2201/2029; D07B 2201/2006
  USPC ............................................ 57/311, 210, 212
  See application file for complete search history.

(56) References Cited

FOREIGN PATENT DOCUMENTS

| | | |
|---|---|---|
| JP | 3-128689 U | 12/1991 |
| JP | 6-306784 A | 11/1994 |
| JP | 7-126992 A | 5/1995 |
| JP | 7-186614 A | 7/1995 |
| JP | 9-31874 A | 2/1997 |
| JP | 2001-98460 A | 4/2001 |
| JP | 2001-98480 A | 4/2001 |
| JP | 2003-247182 A | 9/2003 |
| JP | 2003-291608 A | 10/2003 |
| JP | 2005-120491 A | 5/2005 |
| JP | 2006-169692 A | 6/2006 |
| JP | 2006-328557 A | 12/2006 |
| JP | 2007-63706 A | 3/2007 |
| JP | 2008-291380 A | 12/2008 |
| JP | 2010-264947 A | 11/2010 |
| JP | 2011-25798 A | 2/2011 |
| WO | 2007/026825 A1 | 3/2007 |
| WO | 2008/026272 A1 | 3/2008 |

OTHER PUBLICATIONS

International Search Report for PCT/JP2012/057650 dated Jun. 19, 2012.
Japanese Office Action, dated Sep. 16, 2014, issued in corresponding Japanese Patent Application No. 2013-506048.
Supplemental European Search Report and European Search Opinion accompanied by Communication, dated Sep. 30, 2014, issued in corresponding European Patent Application No. 12760598.8.

* cited by examiner (a)　　　(b)　　　(c)　　　(d)　　　(e)

STEEL CORD FOR RUBBER ARTICLE REINFORCEMENT AND PNEUMATIC RADIAL TIRE USING SAME

TECHNICAL FIELD

The present invention relates to a steel cord for reinforcing rubber articles and a pneumatic radial tire (hereinafter, also simply referred to as "steel cord" and "tire", respectively) using the same, more specifically, to a steel cord for reinforcing rubber articles which, when applied to a belt of a tire, can attain lightweight without reducing the durability of the tire, and in particular, to a steel cord for reinforcing rubber articles in which the properties of a treat after rubberizing are excellent and a pneumatic radial tire using the same.

BACKGROUND ART

At present, a reinforcing member for a carcass constituting a skeleton of a radial tire for a passenger vehicle, in particular, a belt which is generally used as a reinforcing member for a crown portion of a carcass is mainly constituted such that two or more steel belt layers composed of layers in which rubberized steel cord obliquely arranged with respect to the tire equatorial plane are used, and that the steel cords in the belt layers are crossed each other.

In recent years, the importance of environmental performance is increasing, and there is a growing need for lightweight of a rubber article or a tire in which a steel cord is employed as a reinforcing member. Examples of a method in which the weight of a tire is reduced include a method in which the amount of rubber used in a belt treat is reduced and the thickness of the belt is reduced. However, when the amount of rubber used in a belt treat is reduced, the distance between cords of a first belt layer and a second belt layer becomes short, a so-called belt edge separation (BES) in which rubber separation originating from the cord end at the end portion in the belt width direction easily propagates between cords easily occurs, and the durability is reduced. As a method of improving such BES, a method is known in which the thickness of the rubber at the belt end portion is increased compared with a normal tire. Of course, however, the weight of the tire is thus increased, which is contrary to the lightweight of the tire which is an expected object.

Examples of a method of reducing the weight of a tire other than reducing the amount of rubber used for a belt treat include a method of reducing the amount of steel used in the tire, for example, a method of reducing the end count of steel cords is conceivable. However, when the end count of steel cords is reduced, the rigidity of the belt is reduced, which is not preferred. Under such circumstances, many proposals are being made regarding the improvement of the lightweight or durability of a tire. For example, Patent Document 1 proposes a steel cord having an M(M=2 to 5)+N(N=1 to 3) structure and the numbers of filaments thereof satisfies N≥M for the purpose of reducing the weight of a tire. Patent Document 2 discloses a steel cord having a 2+3 structure for the purpose of improving the durability of a belt. Other than these, Patent Documents 3 to 7 disclose a steel cord having a 2+3 structure for the purpose of improving a variety of physical properties or workability of a reinforcing member of a tire which are needed.

RELATED ART DOCUMENTS

Patent Documents

Patent Document 1: Japanese Unexamined Patent Application Publication No. 2001-98480
Patent Document 2: Japanese Unexamined Utility Model Application Publication No. H3-128689
Patent Document 3: Japanese Unexamined Patent Application Publication No. H6-306784
Patent Document 4: Japanese Unexamined Patent Application Publication No. H7-126992
Patent Document 5: Japanese Unexamined Patent Application Publication No. 2001-98460
Patent Document 6: Japanese Unexamined Patent Application Publication No. 2006-328557
Patent Document 7: Japanese Unexamined Patent Application Publication No. 2007-63706

SUMMARY OF INVENTION

Problems to be Solved by the Invention

However, even a steel cord of Patent Document 1 is far from fulfilling the demand of lightweight of a tire which is needed today, and a technique of further lightweight is needed. Although a steel cord of Patent Document 2 has an improved durability by increasing permeability of rubber into steel cords, lightweight of a tire is not examined. Further, it is the status quo that, also for steel cords of Patent Documents 3 to 7, examination regarding lightweight of a tire is not necessarily satisfactory.

Still further, a steel cord having a M+N structure is conventionally manufactured by a buncher type strander from the viewpoint of productivity. In a steel cord manufactured by using a buncher type strander, a torsion is applied to a steel filament constituting the steel cord, whereby a steel cord having a M+N structure is constituted by steel filaments each having considerably varied torsion. For this reason, in a rubber-steel cord complex formed by rubberizing a steel cord having an M+N structure (hereinafter, referred to as a treat), this treat is cut in a cutting process, the end of the treat is sprung out and curled, and the workability deteriorates, which has been problematic. Such problems have not been examined sufficiently in Patent Documents 1 to 7, which is the status quo.

Accordingly, an object of the present invention is to provide a steel cord for reinforcing rubber articles which, when applied to a belt of a tire, can attain lightweight without reducing the durability of the tire, and a pneumatic radial tire using the same.

Another object of the present invention is to provide a steel cord for reinforcing rubber articles in which the properties of a treat after rubberizing are excellent and a pneumatic radial tire using the same.

Means for Solving the Problems

In order to solve the above-mentioned problems, the present inventor intensively studied to find that, in a steel cord having a 2+N structure, if the diameters of a core filament and a sheath filament satisfy a predetermined relationship, the weight of a belt treat can be reduced while maintaining the distance between cords of the belt, and that if the average corrugation rates of a core filament and a sheath filament satisfy a predetermined relationship, the properties of a treat can be improved, thereby completing the present invention.

In other words, a steel cord for reinforcing rubber articles of the present invention is a steel cord for reinforcing rubber articles comprising a core formed by arranging two core filaments in parallel without being twisted together, and N (2≤N≤4) sheath filaments which are twisted together around the core, wherein, letting the diameter of the core filament be d1, and the diameter of the sheath filament be d2, d1>d2.

In the present invention, the d1/the d2 is preferably 1.1 to less than 1.7. In the present invention, the d1/the d2 is preferably 1.1 to less than 1.4. Further, in the present invention, letting the average corrugation rate of the core filament be H1, and the average corrugation rate of the sheath filament be H2, preferably H1>H2. Still further, in the present invention, the H1 is preferably 70 to 110%. In the present invention, preferably the d1 is 0.16 to 0.32 mm, and the d2 is 0.12 to 0.29 mm. Further, in the present invention, the number of the sheath filament is preferably three.

A pneumatic radial tire of the present invention is a pneumatic radial tire comprising a carcass composed of at least one carcass layer toroidally bridging between a left-right pair of bead cores, a tread portion that is arranged outside of a crown region of the carcass in the tire radial direction to form a ground contacting portion, and a belt composed of at least two belt layers which are arranged between the tread portion and a crown region of the carcass to form a reinforcing portion, wherein both a first belt layer and a second belt layer which are the first layer and the second layer of the belt are formed such that steel cords for reinforcing rubber articles of the above-mentioned the present invention are arranged in parallel in the belt width direction and embedded in coating rubber.

In the present invention, the d1/the d2 is preferably 1.1 to less than 1.7. In the present invention, the d1/d2 is preferably 1.1 to less than 1.4. Further, in the present invention, letting the average corrugation rate of the core filament be H1, and the average corrugation rate of the sheath filament be H2, preferably H1>H2. Still further, in the present invention, the H1 is preferably 70 to 110%. Preferably the d1 is 0.16 to 0.32 mm, and the d2 is 0.12 to 0.29 mm. Further, in the present invention, the number of the sheath filaments is preferably three. Still further, in the present invention, the gauge of a rubber layer between steel cords of a first belt layer and a second belt layer at the end portion of the second belt layer is preferably larger than that at the tire center portion. In the present invention, the thickness of the belt layer is preferably 0.85 to 1.65 mm.

Effects of the Invention

By the present invention, a steel cord for reinforcing rubber articles which, when applied to a belt of a tire, can attain lightweight without reducing the durability of the tire, in particular, a steel cord for reinforcing rubber articles in which the properties after a treat is rubberized are excellent and a pneumatic radial tire using the same can be provided.

MODE FOR CARRYING OUT THE INVENTION

In the following, embodiments of the present invention will be described by way of the Drawings.

A steel cord of the present invention is a steel cord for reinforcing rubber articles comprising a core formed by arranging two core filaments in parallel without being twisted together, and N, suitably, two to four, particularly suitably, three sheath filaments which are twisted together around the core.

In the steel cord of the present invention, letting the diameter of the core filament be d1, and the diameter of the sheath filament be d2, d1>d2.

Figure 1:
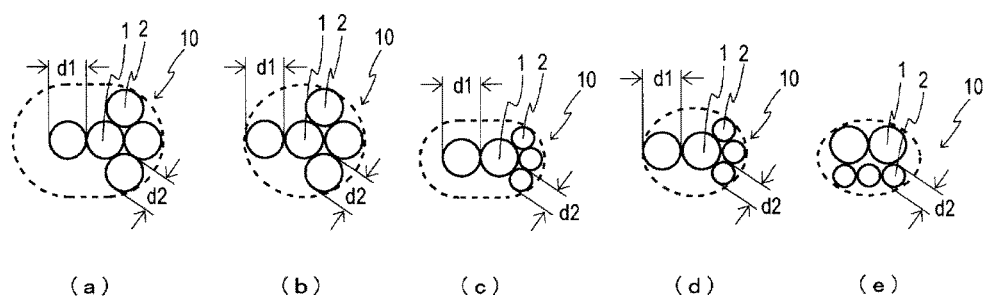
FIG. 1 is a comparison figure of the minor axes of steel cords; (a) and (b) represent the case where d1=d2, (c) to (e) represent the case where d1>d2.

In FIG. 1, (a) to (e) are comparison figures of the minor axes of steel cords; (a) and (b) represent the case where d1=d2, (c) to (e) represent the case where d1>d2. As illustrated, the minor axis of a steel cord 10 having a 2+N (2≤N≤4) structure (in the illustrated drawings, a 2+3 structure) is ruled by the diameter of a sheath filament 2. Accordingly, as mentioned below, by making the diameter of the sheath filament 2 d2 smaller than the diameter of the core filament 1 d1, the minor axis of a steel cord can be made small. Therefore, by applying a steel cord of the present invention to, for example, reinforcing members of a first belt layer and a second belt layer of a belt constituting a tire, the thickness of the belt layer can be made thin while maintaining the distance between a steel cord of the first belt layer and a steel cord of the second belt layer. By this, lightweight of a belt can be attained without reducing the resistance against BES, a so-called BES resistance. In addition, since the amount of steel used can be reduced, lightweight of a tire further can be attained.

In the steel cord of the present invention, d1/d2 is preferably 1.1 to less than 1.7. As described in detail in a below-mentioned pneumatic radial tire of the present invention, when a steel cord of the present invention is applied to reinforcing members of a first belt layer and a second belt layer of a belt constituting a tire, the gauge of the inside of a first belt layer in the tire radial direction and the gauge of the outside of a second belt layer in the tire radial direction can be made thick while maintaining the distance between the steel cord of the first belt layer and the steel cord of the second belt layer the same. By this, the adhesion durability of the belt layer is improved, and at the same time, the belt breaking strength can also be secured. In other words, when d1/d2 is 1.7 or higher, the bending of the steel cord 10 becomes flexible, the fatigability against the core filament 1 is decreased. On the other hand, when d1/d2 is less than 1.1, gauges G1 and G2 of the inside of the first belt layer in the tire radial direction and the outside of the second belt layer in the tire radial direction can not be secured. Suitably, d1/d2 is 1.1 to less than 1.4.

The steel cord of the present invention preferably satisfies, letting the average corrugation rate of core filament 1 be H1, and the average corrugation rate of sheath filament 2 be H2, the relationship of H1>H2. Here, the average corrugation rate H (%) of the core filament 1 and the sheath filament 2 is defined, letting the average of amplitude A of the filament be Aave., by the formula below: average corrugation rate H (%)=Aave./(2×d1+d2)×100.

Figure 2:
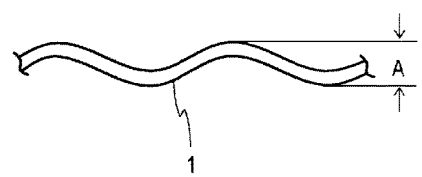
FIG. 2 is an explanatory drawing of the amplitude of a filament.

The average of the amplitude A Aave. means the average of the maximum and minimum, A1 and A2 of the amplitude of a filament measured after unravelling the steel cord. FIG. 2 is an explanatory drawing illustrating the amplitude of a filament.

A treat which is a material of a belt layer constituting a tire is generally manufactured by aligning a large number of steel cords in parallel and arranging an unvulcanized rubber on top and bottom of the steel cords to rubberize the steel cords. In a steel cord having a 2+N (N=2 to 4) structure manufactured by a buncher type strander, the torsions of a core filament 1 and a sheath filament 2 are generated in opposite directions, respectively. In particular, the torsion generated in each filament having an M+N structure satisfying the relationship of d1>d2 is larger than the torsion difference of each filament having the relationship of d1=d2.

Figure 3:
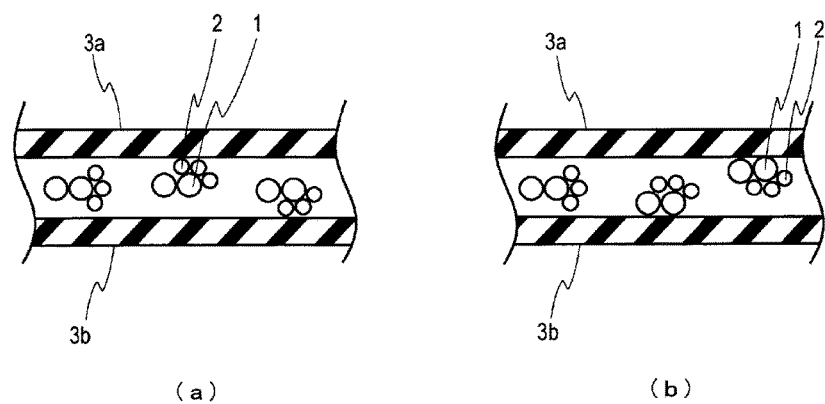
FIG. 3 is a partial cross-sectional view of a treat, (a) represents the case where H1<H2, (b) represents the case where H1>H2.

FIG. 3 is a partial cross-sectional view of a treat; (a) is the case where H1<H2, (b) is the case where H1>H2. As illustrated in FIG. 3(a), when the average corrugation rate H1(%) of the core filament 1 is small, the position of the core filament 1 is hardly changed, and therefore, the core filament 1 does not come in touch with a coating rubber 3a, 3b which are arranged on the top and bottom of the steel cord and only a sheath filament 2 is in contact with the coating rubber 3a, 3b. Under such circumstances, rotation of the sheath filament 2 due to torsion is restricted by a coating rubber 3a, 3b, and the core filament 1 is not in contact with the coating rubber 3a, 3b, and thereby rotation of the core filament 1 due to torsion occurs when a treat is cut, whereby a curl is generated on the treat.

Hence, in the steel cord of the present invention, as illustrated in FIG. 3(b), by setting H1>H2, and providing a portion where, in the longer direction of the steel cord, the core filament 1 and the coating rubber 3a, 3b are in contact with each other, rotation of the core filament 1 due to torsion is prevented to avoid curl of the treat when a treat is cut. Suitably, the value of H1/H2 is 1.10 to 1.40.

In the steel cord of the present invention, the average corrugation rate H1(%) of the core filament 1 is preferably 70 to 110%. When H1 is less than 70%, a treat may be curled influenced by the average corrugation rate H2 of the sheath filament 2, which is not preferred. On the other hand, when H1 is larger than 110%, the cord properties of the steel cord 10 may be unstable, which is not preferred.

In the steel cord of the present invention, the diameter of the core filament 1 d1 is preferably 0.16 to 0.32 mm, and the diameter of the sheath filament 2 d2 is preferably 0.12 to 0.29 mm. If the filament diameter is higher than the above-mentioned range, even when the steel cord of the present invention is used as a belt reinforcing member, a sufficient effect of lightweight may not be obtained. On the other hand, when the filament diameter is less than the above-mentioned range, the belt strength may be insufficient.

When the steel cord of the present invention is used as a belt reinforcing member, a steel filament having a tensile strength of 2700 N/mm$^2$ or higher is preferably used. As a steel filament having a high tensile strength, those having carbon by at least 0.72% by mass, particularly at least 0.82% by mass can be suitably employed. In the present invention, conditions such as the twist direction of the sheath filament 2, and the twist pitch are not particularly restricted, and the belt reinforcing member is appropriately constituted according to a conventional method.

Next, a pneumatic radial tire of the present invention will be described.

Figure 4:
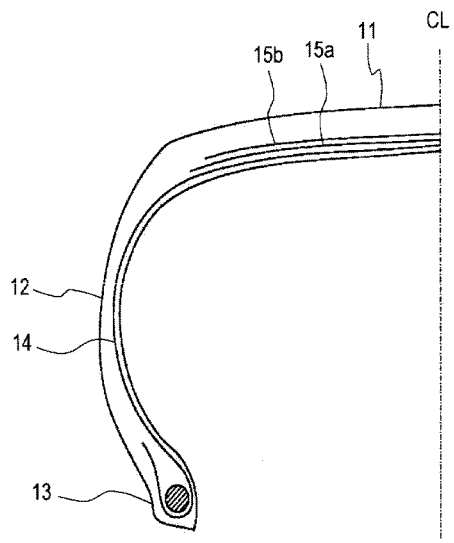
FIG. 4 is a half sectional view illustrating one suitable example of a pneumatic radial tire of the present invention.

FIG. 4 illustrates a half sectional view of one suitable example of a pneumatic radial tire of the present invention. The illustrated tire comprises a tread portion 11 which is arranged at a crown region of a carcass and forms a ground contacting portion, a pair of sidewall portions 12 which are continued to the both side portions of the tread portion 11 and extend inside in the tire radial direction, and a bead portion 13 which is continued to the inner circumference of each sidewall portion 12.

The tread portion 11, sidewall portion 12 and bead portion 13 are reinforced by a carcass 14 composed of one carcass layer extending toroidally from one bead portion 13 to the other bead portion 13. The tread portion 11 is reinforced by a belt composed of at least two layers, in the illustrated example, two layers of a first belt layer 15a and a second belt layer 15b arranged outside a crown region of the carcass 14 in the tire radial direction, which are described below in detail. Here, the number of carcass layers of the carcass 14 may be plural, and an organic fiber cord which extends in a direction substantially orthogonal to the tire circumferential direction, for example, in an angle of 70 to 90° can be suitably used.

In a tire of the present invention, both the first belt layer 15a and the second belt layer 15b are formed such that steel cords for reinforcing rubber articles comprising a core formed by arranging two core filaments in parallel without being twisted together, and N (2≤N≤4) sheath filaments which are twisted together around the core, wherein, letting the diameter of the core filament be d1, and the diameter of the sheath filament be d2, d1>d2 are embedded in a coating rubber in parallel with the tire width direction such that the major axis is in the tire width direction. By using a steel cord of the present invention, the thickness of the belt layer can be thin while maintaining the distance between a steel cord of the first belt layer 15a and a steel cord of the second belt layer 15b. By this, lightweight of a belt can be attained without reducing the resistance against BES, a so-called BES resistance. In addition, since the amount of steel used can be reduced, lightweight of a tire further can be attained.

Figure 5:
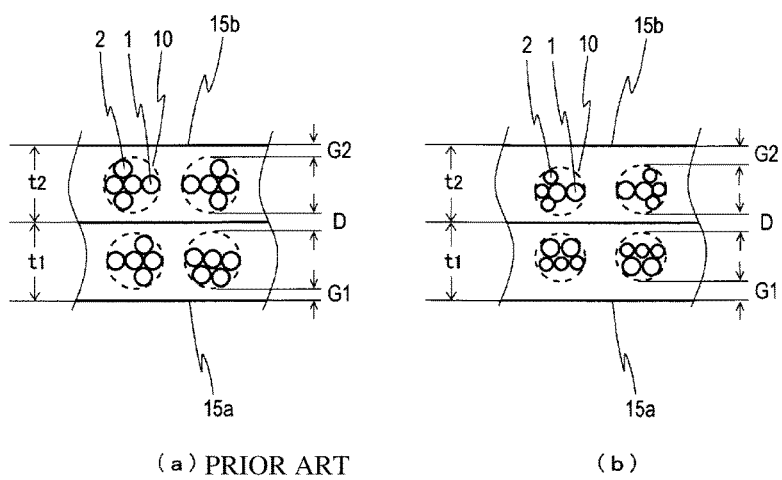
FIG. 5 is an enlarged partial cross-sectional view of a belt of a pneumatic radial tire; (a) represents a conventional tire and (b) represents a tire according to the present invention.

FIG. 5 is an enlarged partial cross-sectional view of a belt of a pneumatic radial tire; (a) represents a conventional tire and (b) represents a tire according to the present invention. As illustrated in FIG. 5(a), a steel cord 10 having a 2+N structure (2≤N≤4, in the illustrated example, N=3) has a larger cord diameter in the longitudinal direction when the sheath filament 2 is aligned longitudinally (in the tire radial direction). However, as illustrated in FIG. 5(b), since, in a steel cord of a tire of the present invention, d1>d2, increase in the cord diameter in the longitudinal direction compared with a conventional steel cord can be suppressed. As a result, the gauge G1 of the inside of a first belt layer 15a in the tire radial direction and the gauge G2 of the outside of a second belt layer 15b in the tire radial direction can be made thick while maintaining the distance D between the steel cord of the first belt layer 15a and the steel cord of the second belt layer 15b the same and maintaining the BES resistance. By this, the adhesion durability of the belt can be improved.

In a pneumatic radial tire of the present invention, d1/d2 is preferably 1.1 to less than 1.7. By satisfying such a relationship, the adhesion durability can be improved, and at the same time, the belt breaking strength can be secured. In other words, when d1/d2 is 1.7 or higher, the bending of the steel cord 10 becomes flexible, the fatigability against the core filament 1 is decreased in some cases. On the other hand, when d1/d2 is less than 1.1, gauges G1 and G2 of the inside of the first belt layer in the tire radial direction and the outside of the second belt layer in the tire radial direction can not be secured in some cases. Suitably, d1/d2 is 1.1 to less than 1.4.

Further, in a pneumatic radial tire of the present invention, letting the average corrugation rate of the core filament 1 be H1 and the average corrugation rate of the sheath filament 2 be H2, the relationship H1>H2 is preferably satisfied. This is because since a treat for which a steel cord of the present invention is used does not curl, and the properties of the cord for itself is stable, the treat has an excellent workability during the manufacture of a tire.

In a tire of the present invention, a cross belt formed by laminating a first belt layer 15a and a second belt layer 15b such that the cords which constitute the layers are crossed with each other sandwiching an equatorial plane is preferred. On the outside of the first belt layer 15a and second belt layer 15b in the tire radial direction, a belt layer may further be arranged, or a circumferential direction belt layer composed of a layer formed by rubberizing cords aligned substantially in parallel to the tire circumferential direction may be provided. For such a cord, a cord composed of an organic fiber can be suitably used. For example, a cord composed of a polyester fiber, a nylon fiber, an aramid fiber, or a polyketone fiber can be suitably used.

In a tire of the present invention, preferably the diameter of the core filament 1 d1 is 0.16 to 0.32 mm, and the diameter of the sheath filament 2 d2 is 0.12 to 0.29 mm. When the filament diameter is larger than the above-mentioned range, a sufficient lightweight effect may not be obtained. On the other hand, when the filament diameter is smaller than the above-mentioned range, the belt strength may be insufficient.

Figure 6:
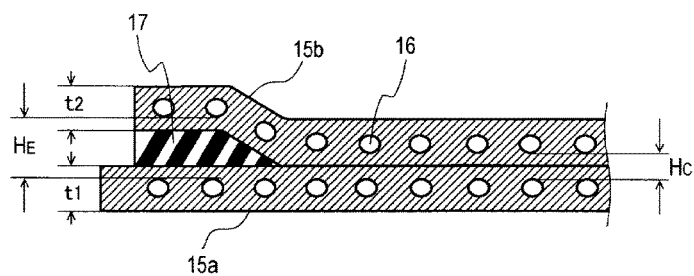
FIG. 6 is an enlarged partial cross-sectional view illustrating the vicinity of the end portion of a belt layer according to a suitable embodiment of a pneumatic radial tire of the present invention.

FIG. 6 illustrates an enlarged partial cross-sectional view illustrating the vicinity of the end portion of a belt layer according to a suitable embodiment of a pneumatic radial tire of the present invention. As illustrated, in a tire of the present invention, a gauge $H_E$ of a rubber layer between steel cords 16 of the first belt layer 15a and the second belt layer 15b at the end of the second belt layer 15b is preferably larger than a gauge $H_C$ at the tire center portion. Suitably, $H_E$ is 1.3 to 3.0 times $H_C$, and preferably 1.8 to 2.6 times $H_C$. By arranging a rubber between belts 17 having a thick gauge at the end of a belt, the belt durability can further be improved. When the value is less than 1.3, such an effect can not be sufficiently obtained. On the other hand, the value is larger than 3.0, lightweight of a tire may be insufficient.

In a tire of the present invention, from the viewpoint of lightweight of a tire and improvement in the durability, suitably, the thicknesses of belt layer t1, t2 are 0.85 to 1.65 mm, more suitably, 0.95 to 1.35 mm (see FIG. 6). When the thicknesses of the belt layers t1, t2 are less than 0.85 mm, a sufficient durability can not be obtained in some cases; on the other hand, when the thicknesses of the belt layers t1, t2 are not less than 1.65 mm, a sufficient lightweight effect can not be obtained in some cases.

Still further, in a tire of the present invention, the end count of steel cords in a belt is preferably 22 to 57/50 mm. When the end count is less than the above-mentioned range, the tensile strength may be insufficient or the rigidity of the belt may be decreased, which are not preferred. On the other hand, when the end count is larger than the above-mentioned range, it becomes difficult to secure a cord interval, which makes it difficult to effectively restrict the BES, and the belt durability may be reduced.

In a tire of the present invention, a steel filament having a tensile strength of 2700 N/mm$^2$ or higher is preferably used in order to secure the belt strength. As a steel filament having a high tensile strength, those having carbon by at least 0.72% by mass, particularly at least 0.82% by mass can be suitably employed. In the present invention, conditions such as the twist direction of the sheath filament 2, and the twist pitch are not particularly restricted, and the belt reinforcing member is appropriately constituted according to a conventional method.

In a pneumatic radial tire of the present invention, as long as the structure of a belt satisfy the above requirements, other specific tire structure is not particularly restricted. A pneumatic radial tire of the present invention can be suitably used as an automobile tire. As a gas with which the tire to be filled, a normal air or an air whose oxygen partial pressure is adjusted, as well as an inert gas such as nitrogen, argon or helium can be used.

EXAMPLES

The present invention will now be described in detail by way of Examples.

Examples 1-1 to 1-10 and Comparative Examples 1-1 to 1-6

Tires having a tire size of 195/65R15 were manufactured by using, as a belt reinforcing member, a steel cord having a structure indicated in the Tables 1 to 4 below. The belt was composed of three belt layers; a steel cord indicated in the Tables 1 to 4 below was applied to a first belt layer and a second belt layer. The implantation angle of the steel cord was set to ±26° with respect to the tire circumferential direction. As the outermost belt layer, a circumferential direction belt layer composed of a layer formed by rubberizing organic fiber cords aligned substantially in parallel to the tire circumferential direction was arranged. For each obtained tire, the durability (BES performance) and the tire weight thereof were evaluated according to the below-mentioned procedure.

Example 1-11, 1-12 and Comparative Example 1-7, 1-8

Tires having a tire size of 265/70R16 were manufactured by using, as a belt reinforcing member, a steel cord having a structure indicated in the Table 5 below. The belt was composed of three belt layers; a steel cord indicated in the Table 5 below was applied to a first belt layer and a second belt layer. The implantation angle of the steel cord was set to ±24° with respect to the tire circumferential direction. As the outermost belt layer, a circumferential direction belt layer composed of a layer formed by rubberizing organic fiber cords aligned substantially in parallel to the tire circumferential direction was arranged. For each obtained tire, the durability (BES performance) and the tire weight thereof were evaluated according to the below-mentioned procedure.

<Durability>

Each test tire was mounted on a standard rim which is defined in JATMA standards, and then, the tire was inflated to an inner pressure of 210 kPa and mounted on a passenger vehicle. A load of twice the normal load was applied and the vehicle was allowed to travel on a pavement surface for 20000 km. Then, the tire was dissected to compare the separation length at the belt end portion. Indexation was performed in Examples 1-1 to 1-4 and Comparative Example 1-2 with reference to Comparative Example 1-1, in Example 1-5 and Comparative Example 1-4 with reference to Comparative Example 1-3, in Example 1-6 and 1-7 with reference to Comparative Example 1-5, in Example 1-8 to 1-10 with reference to Comparative Example 1-6, in Example 1-11, 1-12 and Comparative Example 1-8 with reference to Comparative Example 1-7, and at the same time, evaluation was performed denoting "○" when the durability is the same as or better than that of a standard tire, and denoting "x" when poorer than that of a standard tire. The results are listed on the Tables 1 to 5 in combination. The smaller the index, the more excellent the durability.
<Tire Weight>

The weight of each tire was measured. In Examples 1-1 to 1-4 and Comparative Example 1-2 with reference to Comparative Example 1-1, in Example 1-5 and Comparative Example 1-4 with reference to Comparative Example 1-3, in Example 1-6 and 1-7 with reference to Comparative Example 1-5, in Examples 1-8 to 1-10 with reference to Comparative Example 1-6, in Example 1-11, 1-12 and Comparative Example 1-8 with reference to Comparative Example 1-7, when the tire weight is reduced by not less than 200 g, the tire was evaluated as "⊚", and when the tire weight is reduced by 100 g to less than 200 g, the tire was evaluated as "○". The results are listed on the Tables 1 to 5.
<Overall Evaluation>

If there was no "x" in the evaluation of the durability and tire weight reduction, the overall evaluation was "○"; if there was any "x", the overall evaluation was "x".

Examples 2-1 to 2-6 and Comparative Examples 2-1 to 2-4

Tires having a tire size of 195/65R15 were manufactured by using, as a belt reinforcing member, a steel cord having a structure indicated in the Tables 6 to 8 below. The belt was composed of three belt layers; a steel cord indicated in the Tables 6 to 8 below was applied to a first belt layer and a second belt layer. The implantation angle of the steel cord was set to ±26° with respect to the tire circumferential direction. As the outermost belt layer, a circumferential direction belt layer composed of a layer formed by rubberizing organic fiber cords aligned substantially in parallel to the tire circumferential direction was arranged. For each obtained tire, the durability (BES performance) and the tire weight thereof were evaluated according to the below-mentioned procedure.
<Durability>

Each test tire was mounted on a standard rim which is defined in JATMA standards, and then, the tire was inflated to an inner pressure of 210 kPa and mounted on a passenger vehicle. A load of twice the normal load was applied and the vehicle was allowed to travel on a pavement surface for 20000 km. Then, the tire was dissected to compare the separation length at the belt end portion. Indexation was performed in Examples 2-1 to 2-3 and Comparative Example 2-2 with reference to Comparative Example 2-1, in Example 2-4 with reference to Comparative Example 2-3, in Examples 2-5 to 2-6 with reference to Comparative Example 2-4, and at the same time, evaluation was performed denoting "○" when the durability is the same as or better than that of a standard tire, and denoting "x" when poorer than that of a standard tire. The results are listed on the Tables 6 to 8 in combination. The smaller the index, the more excellent the durability.
<Tire Weight>

The weight of each tire was measured. In Examples 2-1 to 2-3 and Comparative Example 2-2 with reference to Comparative Example 2-1, in Example 2-4 with reference to Comparative Example 2-3, in Examples 2-5 to 2-6 with reference to Comparative Example 2-4, when the tire weight is reduced by not less than 100 g, the tire was evaluated as "⊚", when the tire weight is reduced by 50 g to less than 100 g, the tire was evaluated as "○", and when the tire weight is reduced by less than 50 g, the tire was evaluated as "x". The results are listed on the Tables 6 to 8 in combination.
<Cord Fatigability>

After each test tire was mounted on a standard rim defined in JATMA standards, a load of 1.05 times the normal load was applied, and the tire was inflated to an inner pressure of 100 kPa. By using a vehicle equipped with an autopilot system which can perform "figure 8" shaped travelling, after 300 laps running on a "figure 8" shaped test course at a turning acceleration of 0.7 G, at a speed of 25 km/h, the tire was dissected to compare the belt breaking strength. The breakage occurrence rate of a steel cord was indexed in Examples 2-1 to 2-3 and Comparative Example 2-2 with reference to Comparative Example 2-1 being 100, in Example 2-4 with reference to Comparative Example 2-3 being 100, and in Examples 2-5 to 2-6 with reference to Comparative Example 2-5 being 100. When the value was less than 100, the evaluation was represented by "⊚" (good), when the value was 100 to less than 110, the evaluation was represented by "○" (similar), and when the value was not less than 110, the evaluation was represented by "x" (poor). The results are listed on the Tables 6 to 8 in combination. The smaller the value, the more excellent the cord fatigability.
<Adhesion Durability>

For each test tire, a practical running was performed for 50,000 km using a normal inner pressure and a normal load in a high temperature and high humidity region. Then, four steel cords were separated from rubber at room temperature to evaluate the adhesion durability by the amount of rubber attached. In Examples 2-1 to 2-3 and Comparative Example 2-2 with reference to Comparative Example 2-1, in Example 2-4 with reference to Comparative Example 2-3, and in Examples 2-5 to 2-6 with reference to Comparative Example 2-4, when the amount of rubber attached is large, the evaluation was represented by "⊚" (good), when the amount of rubber attached is similar, the evaluation was represented by "○", when the amount of rubber attached is poor, the evaluation was represented by "x" (poor). The results are listed on the Tables 6 to 8 in combination. The larger the value, the more excellent the adhesion durability.
<Treat Curl Properties>

A treat was manufactured by paralleling a plurality of steel cords having a structure indicated in the Tables 6 to 8 below to have the end count indicated in the same Tables and covering the steel cords from the top with an unvulcanized rubber from the top and bottom. Each obtained treat was cut and whether a lift occurred in the treat or not was observed. In Examples 2-1 to 2-3 and Comparative Example 2-2 with reference to Comparative Example 2-1, in Example 2-4 with reference to Comparative Example 2-3, and in Examples 2-5 to 2-6 with reference to Comparative Example 2-4, when the treat curl properties were improved, the evaluation was represented by "⊚", when the treat curl properties were similar or poor, the evaluation was represented by "x". The obtained results are listed on the Tables 6 to 8.
<Cord Properties Stability>

A steel cord having a structure indicated in the Tables 6 to 8 was fusion cut into a test piece having a length of 1 m. By using a projector, the test piece was magnified 20 times to observe a lift of sheath filament from a core filament. In Examples 2-1 to 2-3 and Comparative Examples 2-2 to 2-3 with reference to Comparative Example 2-1, in Example 2-4 with reference to Comparative Example 2-4, and in Examples 2-5 to 2-6 with reference to Comparative Example 2-6, when the cord properties stability was improved, the evaluation was represented by "○", when the treat curl properties were similar or poor, the evaluation was represented by "x". The obtained results are listed on the Tables 6 to 8.

<Overall Evaluation>

If there was no "x" in the evaluation of the treat curl properties and cord properties stability, the overall evaluation was "○"; if there was any "x", the overall evaluation was "x".

TABLE 1

|  |  | Comparative Example 1-1 | Comparative Example 1-2 | Example 1-1 | Example 1-2 | Example 1-3 | Example 1-4 |
|---|---|---|---|---|---|---|---|
|  | Cord structure | 2 + 3 | 2 + 3 | 2 + 3 | 2 + 3 | 2 + 3 | 2 + 3 |
| First belt layer | Core filament diameter d1 (mm) | 0.24 | 0.24 | 0.24 | 0.24 | 0.22 | 0.18 |
|  | Sheath filament diameter d2 (mm) | 0.24 | 0.24 | 0.17 | 0.17 | 0.18 | 0.15 |
|  | End count (/50 mm) | 34 | 34 | 37 | 37 | 37.5 | 55.0 |
|  | Belt layer thickness t1 (mm) | 1.21 | 1.00 | 1.00 | 1.20 | 1.01 | 1.01 |
| Second belt layer | Core filament diameter d1 (mm) | 0.24 | 0.24 | 0.24 | 0.24 | 0.22 | 0.18 |
|  | Sheath filament diameter d2 (mm) | 0.24 | 0.24 | 0.17 | 0.17 | 0.18 | 0.15 |
|  | End count (/50 mm) | 34 | 34 | 37 | 37 | 37.5 | 55.0 |
|  | Belt layer thickness t2 (mm) | 1.21 | 1.00 | 1.00 | 1.20 | 1.01 | 1.01 |
| Distance between centers of cords at belt center portion (mm) |  | 1.21 | 1.00 | 1.00 | 1.20 | 1.01 | 1.01 |
| Distance between cords at belt center portion $H_C$ (mm) |  | 0.49 | 0.28 | 0.49 | 0.68 | 0.49 | 0.49 |
| Distance between cords at belt end portion $H_E$ (mm) |  | 0.99 | 0.78 | 0.99 | 1.18 | 0.99 | 0.99 |
| Durability (Index/Evaluation) |  | 100 | 120 | 100 | 80 | 100 | 100 |
|  |  | — | X | ○ | ○ | ○ | ○ |
| Tire weight reduction (g/evaluation) |  | — | 128.7 | 246.8 | 124.2 | 246.8 | 324.6 |
|  |  | — | ○ | ⊚ | ○ | ⊚ | ⊚ |
| Overall evaluation |  | — | X | ○ | ○ | ○ | ○ |

<Overall Evaluation>

If there was only "⊚" in the evaluation of the tire weight reduction, cord fatigability and adhesion durability, the overall evaluation was "⊚"; If there was only "⊚" and "○", the overall evaluation was "○"; if there was no "⊚", the overall evaluation was "Δ"; and if there was "x", the overall evaluation was "x". The results are listed on the Tables 6 to 8.

Example 3-1 to 3-5 and Comparative Example 3-1

A treat was manufactured by paralleling a plurality of steel cords having a structure indicated in the Table 9 below to have the end count indicated in the same Tables and covering the steel cords from the top with an unvulcanized rubber from the top and bottom. The thickness of the treat was set to 1.20 mm. For the obtained treat, the treat curl properties and cord properties stability thereof were evaluated according to the below-mentioned procedure.

<Treat Curl Properties>

Each obtained treat was cut and whether a lift occurred in the treat or not was observed. With reference to Comparative Example 3-1, when the treat curl properties were improved, the evaluation was represented by "○"; when the treat curl properties were similar or poor, the evaluation was represented by "x". The obtained results are listed on the Table 9.

<Cord Properties Stability>

A steel cord having a structure indicated in the Table 9 was fusion cut into a test piece having a length of 1 m. By using a projector, the test piece was magnified 20 times to observe a lift of sheath filament from a core filament. With reference to Comparative Example 3-1, when the cord properties stability was improved, the evaluation was represented by "○", when the treat curl properties were similar or poor, the evaluation was represented by "x". The obtained results are listed on the Table 9.

TABLE 2

|  |  | Comparative Example 1-3 | Comparative Example 1-4 | Example 1-5 |
|---|---|---|---|---|
|  | Cord structure | 2 + 3 | 2 + 3 | 2 + 3 |
| First belt layer | Core filament diameter d1 (mm) | 0.24 | 0.24 | 0.24 |
|  | Sheath filament diameter d2 (mm) | 0.24 | 0.24 | 0.17 |
|  | End count (/50 mm) | 34 | 34 | 37 |
|  | Belt layer thickness t1 (mm) | 1.21 | 1.00 | 1.00 |
| Second belt layer | Core filament diameter d1 (mm) | 0.24 | 0.24 | 0.24 |
|  | Sheath filament diameter d2 (mm) | 0.24 | 0.24 | 0.17 |
|  | End count (/50 mm) | 34 | 34 | 37 |
|  | Belt layer thickness t2 (mm) | 1.21 | 1.00 | 1.00 |
| Distance between centers of cords at belt center portion (mm) |  | 1.21 | 1.00 | 1.00 |
| Distance between cords at belt center portion $H_C$ (mm) |  | 0.49 | 0.28 | 0.49 |
| Distance between cords at belt end portion $H_E$ (mm) |  | 0.49 | 0.28 | 0.49 |
| Durability (Index/Evaluation) |  | 100 | 120 | 100 |
|  |  | — | X | ○ |
| Tire weight reduction (g/evaluation) |  | — | 128.7 | 246.8 |
|  |  | — | ○ | ⊚ |
| Overall evaluation |  | — | X | ○ |

TABLE 3

|  |  | Comparative Example 1-5 | Example 1-6 | Example 1-7 |
|---|---|---|---|---|
|  | Cord structure | 2 + 2 | 2 + 2 | 2 + 2 |
| First belt layer | Core filament diameter d1 (mm) | 0.28 | 0.28 | 0.22 |
|  | Sheath filament diameter d2 (mm) | 0.28 | 0.22 | 0.18 |
|  | End count (/50 mm) | 30.5 | 31 | 45 |
|  | Belt layer thickness t1 (mm) | 1.05 | 0.99 | 0.89 |
| Second belt layer | Core filament diameter d1 (mm) | 0.28 | 0.28 | 0.22 |
|  | Sheath filament diameter d2 (mm) | 0.28 | 0.22 | 0.18 |
|  | End count (/50 mm) | 30.5 | 31 | 45 |
|  | Belt layer thickness t2 (mm) | 1.05 | 0.99 | 0.89 |
| Distance between centers of cords at belt center portion (mm) | | 1.05 | 0.99 | 0.89 |
| Distance between cords at belt center portion $H_C$ (mm) | | 0.49 | 0.49 | 0.49 |
| Distance between cords at belt end portion $H_E$ (mm) | | 0.99 | 0.99 | 0.99 |
| Durability (Index/Evaluation) | | 100 | 100 | 100 |
|  |  | — | ◯ | ◯ |
| Tire weight reduction (g/evaluation) | | — | 117.7 | 233.7 |
|  |  | — | ◯ | ◎ |
| Overall evaluation | | — | ◯ | ◯ |

TABLE 4

|  |  | Comparative Example 1-6 | Example 1-8 | Example 1-9 | Example 1-10 |
|---|---|---|---|---|---|
|  | Cord structure | 2 + 4 | 2 + 4 | 2 + 4 | 2 + 4 |
| First belt layer | Core filament diameter d1 (mm) | 0.24 | 0.24 | 0.18 | 0.16 |
|  | Sheath filament diameter d2 (mm) | 0.24 | 0.15 | 0.12 | 0.14 |
|  | End count (/50 mm) | 30 | 37 | 57 | 54 |
|  | Belt layer thickness t1 (mm) | 1.21 | 1.03 | 0.91 | 0.93 |
| Second belt layer | Core filament diameter d1 (mm) | 0.24 | 0.24 | 0.18 | 0.16 |
|  | sheath filament diameter d2 (mm) | 0.24 | 0.14 | 0.12 | 0.14 |
|  | End count (/50 mm) | 30 | 37 | 57 | 54 |
|  | Belt layer thickness t2 (mm) | 1.21 | 1.03 | 0.91 | 0.93 |
| Distance between centers of cords at belt center portion (mm) | | 1.21 | 1.03 | 0.91 | 0.93 |
| Distance between cords at belt center portion $H_C$ (mm) | | 0.49 | 0.49 | 0.49 | 0.49 |
| Distance between cords at belt end portion $H_E$ (mm) | | 0.99 | 0.99 | 0.99 | 0.99 |
| Durability (Index/Evaluation) | | 100 | 100 | 100 | 100 |
|  |  | — | ◯ | ◯ | ◯ |
| Tire weight reduction (g/evaluation) | | — | 262.5 | 370.3 | 313.3 |
|  |  | — | ◎ | ◎ | ◎ |
| Overall evaluation | | — | ◯ | ◯ | ◯ |

TABLE 5

|  |  | Comparative Example 1-7 | Comparative Example 1-8 | Example 1-11 | Example 1-12 |
|---|---|---|---|---|---|
|  | Cord structure | 2 + 3 | 2 + 3 | 2 + 3 | 2 + 3 |
| First belt layer | Core filament diameter d1 (mm) | 0.32 | 0.32 | 0.32 | 0.30 |
|  | Sheath filament diameter d2 (mm) | 0.32 | 0.32 | 0.29 | 0.27 |
|  | End count (/50 mm) | 22 | 22 | 23 | 24 |
|  | Belt layer thickness t1 (mm) | 1.80 | 1.65 | 1.71 | 1.65 |
| Second belt layer | Core filament diameter d1 (mm) | 0.32 | 0.32 | 0.32 | 0.30 |
|  | Sheath filament diameter d2 (mm) | 0.32 | 0.32 | 0.29 | 0.27 |
|  | End count (/50 mm) | 22 | 22 | 23 | 24 |
|  | Belt layer thickness t2 (mm) | 1.80 | 1.65 | 1.71 | 1.65 |
| Distance between centers of cords at belt center portion (mm) | | 1.85 | 1.65 | 1.71 | 1.65 |

TABLE 5-continued

|  | Comparative Example 1-7 | Comparative Example 1-8 | Example 1-11 | Example 1-12 |
|---|---|---|---|---|
| Distance between cords at belt center portion $H_C$ (mm) | 0.84 | 0.69 | 0.84 | 0.84 |
| Distance between cords at belt end portion $H_E$ (mm) | 1.34 | 1.19 | 1.34 | 1.34 |
| Durability (Index/ Evaluation) | 100 — | 110 X | 100 ○ | 100 ○ |
| Tire weight reduction (g/evaluation) | — — | 167.5 ○ | 185.3 ○ | 336.5 ◎ |
| Overall evaluation | — | X | ○ | ○ |

TABLE 6

|  |  | Comparative Example 2-1 | Comparative Example 2-2 | Example 2-1 | Example 2-2 | Example 2-3 |
|---|---|---|---|---|---|---|
| First belt layer | Cord structure | 2 + 3 | 2 + 3 | 2 + 3 | 2 + 3 | 2 + 3 |
|  | Core filament diameter d1 (mm) | 0.24 | 0.24 | 0.22 | 0.18 | 0.24 |
|  | Sheath filament diameter d2 (mm) | 0.24 | 0.24 | 0.18 | 0.15 | 0.17 |
|  | End count (/50 mm) | 34 | 34 | 37.5 | 55 | 37 |
|  | Belt layer thickness t1 (mm) | 1.21 | 1.00 | 1.21 | 1.21 | 1.21 |
| Second belt layer | Core filament diameter d1 (mm) | 0.24 | 0.24 | 0.22 | 0.18 | 0.24 |
|  | Sheath filament diameter d2 (mm) | 0.24 | 0.24 | 0.18 | 0.15 | 0.17 |
|  | End count (/50 mm) | 34 | 34 | 37.5 | 55 | 37 |
|  | Belt layer thickness t2 (mm) | 1.21 | 1.00 | 1.21 | 1.21 | 1.21 |
| d1/d2 |  | 1.00 | 1.00 | 1.41 | 1.22 | 1.20 |
| Average corrugation rate of core filament H1 (%) |  | 85 | 95 | 100 | 90 | 95 |
| Average corrugation rate of sheath filament H2 (%) |  | 75 | 85 | 80 | 75 | 80 |
| H1/H2 |  | 1.13 | 1.11 | 1.25 | 1.20 | 1.18 |
| Distance between centers of cords (mm) |  | 1.21 | 1.00 | 1.21 | 1.21 | 1.21 |
| Distance between 1belt/2belt (mm) |  | 0.49 | 0.28 | 0.70 | 0.67 | 0.76 |
| G1 (mm) |  | 0.245 | 0.240 | 0.350 | 0.335 | 0.38 |
| G2 (mm) |  | 0.245 | 0.240 | 0.350 | 0.335 | 0.38 |
| Tire weight reduction (g/evaluation) |  | — — | 128.7 ◎ | 118.0 ◎ | 124.0 ◎ | 140.7 ◎ |
| Cord fatigability (Index/Evaluation) |  | 100 — | 120 X | 100 ○ | 80 ◎ | 75 ◎ |
| Durability (Index/Evaluation) |  | 100 — | 120 X | 80 ○ | 80 ○ | 75 ○ |
| Adhesion durability (Index) |  | — | X | ◎ | ◎ | ◎ |
| Treat curl properties |  | — | ○ | ○ | ○ | ○ |
| Cord properties stability |  | — | ○ | ○ | ○ | ○ |
| Overall evaluation |  | — | X | ○ | ◎ | ◎ |

TABLE 7

|  |  | Comparative Example 2-3 | Example 2-4 |
|---|---|---|---|
| First belt layer | Cord structure | 2 + 2 | 2 + 2 |
|  | Core filament diameter d1 (mm) | 0.28 | 0.28 |
|  | Sheath filament diameter d2 (mm) | 0.28 | 0.22 |
|  | End count (/50 mm) | 30.5 | 31 |
|  | Belt layer thickness t1 (mm) | 1.21 | 1.21 |
| Second belt layer | Core filament diameter d1 (mm) | 0.28 | 0.28 |
|  | Sheath filament diameter d2 (mm) | 0.28 | 0.22 |
|  | End count (/50 mm) | 30.5 | 31 |
|  | Belt layer thickness t2 (mm) | 1.21 | 1.21 |
| d1/d2 |  | 1.0 | 1.27 |
| Average corrugation rate of core filament H1(%) |  | 90 | 95 |
| Average corrugation rate of sheath filament H2(%) |  | 70 | 75 |
| H1/H2 |  | 1.29 | 1.27 |
| Distance between centers of cords (mm) |  | 1.21 | 1.21 |
| Distance between 1belt/2belt (mm) |  | 0.65 | 0.71 |
| G1 (mm) |  | 0.325 | 0.355 |
| G2 (mm) |  | 0.325 | 0.355 |
| Tire weight reduction (g/evaluation) |  | — — | 135.6 ◎ |
| Cord fatigability (Index/Evaluation) |  | 100 — | 100 ○ |
| Durability (Index/Evaluation) |  | 100 — | 90 ○ |
| Adhesion durability (Index) |  | — | ◎ |
| Treat curl properties |  | — | ○ |
| Cord properties stability |  | — | ○ |
| Overall evaluation |  | — | ○ |

TABLE 8

|  |  | Comparative Example 2-4 | Example 2-5 | Example 2-6 |
|---|---|---|---|---|
| First belt layer | Cord structure | 2 + 4 | 2 + 4 | 2 + 4 |
|  | Core filament diameter d1 (mm) | 024 | 0.24 | 0.18 |
|  | Sheath filament diameter d2 (mm) | 024 | 0.15 | 0.12 |
|  | End count (/50 mm) | 30 | 37 | 57 |
|  | Belt layer thickness t1 (mm) | 1.21 | 1.21 | 1.21 |
| Second belt layer | Core filament diameter d1 (mm) | 0.24 | 0.24 | 0.18 |
|  | Sheath filament diameter d2 (mm) | 0.24 | 0.15 | 0.12 |
|  | End count (/50 mm) | 30 | 37 | 57 |
|  | Belt layer thickness t2 (mm) | 1.21 | 1.21 | 1.21 |
|  | d1/d2 | 1.0 | 1.6 | 1.5 |
| Average corrugation rate of core filament H1(%) |  | 90 | 100 | 95 |
| Average corrugation rate of sheath filament H2(%) |  | 75 | 80 | 80 |
| H1/H2 |  | 1.20 | 1.25 | 1.18 |
| Distance between centers of cords (mm) |  | 1.21 | 1.21 | 1.21 |
| Distance between 1belt/2belt (mm) |  | 0.49 | 0.67 | 0.79 |
| G1 (mm) |  | 0.245 | 0.335 | 0.395 |
| G2 (mm) |  | 0.245 | 0.335 | 0.395 |
| Tire weight reduction (g/evaluation) |  | — | 152.2 | 186.4 |
|  |  | — | ◎ | ◎ |
| Cord fatigability (Index/Evaluation) |  | 100 | 100 | 70 |
|  |  | — | ○ | ◎ |
| Durability (Index/Evaluation) |  | 100 | 85 | 70 |
|  |  | — | ○ | ○ |
| Adhesion durability (Index) |  | — | ◎ | ◎ |
| Treat curl properties |  | — | ○ | ○ |
| Cord properties stability |  | — | ○ | ○ |
| Overall evaluation |  | — | ○ | ◎ |

TABLE 9

|  | Comparative Example 3-1 | Example 3-1 | Example 3-2 | Example 3-3 | Example 3-4 | Example 3-5 |
|---|---|---|---|---|---|---|
| Cord structure | 2 + 3 | 2 + 3 | 2 + 3 | 2 + 2 | 2 + 4 | 2 + 3 |
| Core filament diameter d1 (mm) | 0.24 | 0.22 | 0.32 | 0.22 | 0.24 | 0.22 |
| Sheath filament diameter d2 (mm) | 0.24 | 0.18 | 0.29 | 0.18 | 0.15 | 0.18 |
| End count (/50 mm) | 36 | 37.5 | 22 | 45 | 37 | 37.5 |
| Core filament corrugation rate H1 (%) | 85 | 95 | 100 | 90 | 95 | 105 |
| Sheath filament corrugation rate H2 (%) | 70 | 85 | 80 | 70 | 70 | 90 |
| d1/d2 | 1.00 | 1.22 | 1.10 | 1.22 | 1.60 | 1.22 |
| H1/H2 | 1.21 | 1.12 | 1.25 | 1.29 | 1.36 | 1.17 |
| Treat curl properties | — | ○ | ○ | ○ | ○ | ○ |
| Cord properties stability | — | ○ | ○ | ○ | ○ | ○ |
| Overall | — | ○ | ○ | ○ | ○ | ○ |

From the Tables 1 to 8, it was confirmed that a steel cord for reinforcing rubber articles of the present invention was those which, when applied to a belt of a tire, can attain lightweight without reducing the durability of the tire. From the Table 9, it was confirmed that a steel cord for reinforcing rubber articles of the present invention had excellent properties of a treat after rubberizing.

REFERENCE SIGNS LIST

1 Core filament
2 Sheath filament
3a, 3b Coating rubber
10 Steel cord
11 Tread portion
12 Sidewall portion
13 Bead portion
14 Carcass
15a First belt layer
15b Second belt layer
16 Steel cord
17 Rubber between belts

The invention claimed is:
1. A steel cord for reinforcing rubber articles comprising a core formed by arranging two core filaments in parallel without being twisted together, and N (2≤N≤4) sheath filaments which are twisted together around the core, wherein, letting the diameter of the core filament be d1, and the diameter of the sheath filament be d2, d1>d2 wherein, letting the average corrugation rate of the core filament be H1, and the average corrugation rate of the sheath filament be H2, H1>H2, and wherein the H1 is 70 to 110%.

2. The steel cord for reinforcing rubber articles according to claim 1, wherein the d1/the d2 is 1.1 to less than 1.7.

3. The steel cord for reinforcing rubber articles according to claim 1, wherein the d1/the d2 is 1.1 to less than 1.4.

4. The steel cord for reinforcing rubber articles according to claim 1, wherein the d1 is 0.16 to 0.32 mm, and the d2 is 0.12 to 0.29 mm.

5. The steel cord for reinforcing rubber articles according to claim 1, wherein the number of the sheath filament is three.

6. A pneumatic radial tire comprising a carcass composed of at least one carcass layer toroidally bridging between a left-right pair of bead cores, a tread portion that is arranged outside of a crown region of the carcass in the tire radial direction to form a ground contacting portion, and a belt composed of at least two belt layers which are arranged between the tread portion and a crown region of the carcass to form a reinforcing portion, wherein both a first belt layer and a second belt layer which are the first layer and the second layer of the belt are formed such that steel cords for reinforcing rubber articles according to claim 1 are arranged in parallel in the belt width direction and embedded in coating rubber.

7. The pneumatic radial tire according to claim 6, wherein the d1/the d2 is 1.1 to less than 1.7.

8. The pneumatic radial tire according to claim 6, wherein the d1/d2 is 1.1 to less than 1.4.

9. The pneumatic radial tire according to claim 6, wherein, letting the average corrugation rate of the core filament be H1, and the average corrugation rate of the sheath filament be H2, H1 >H2.

10. The pneumatic radial tire according to claim 6, wherein the H1 is 70 to 110%.

11. The pneumatic radial tire according to claim 6, wherein the d1 is 0.16 to 0.32 mm, and the d2 is 0.12 to 0.29 mm.

12. The pneumatic radial tire according to claim 6, wherein the number of the sheath filaments is three.

13. The pneumatic radial tire according to claim 6, wherein the gauge of a rubber layer between steel cords of a first belt layer and a second belt layer at the end portion of the second belt layer is larger than that at the tire center portion.

14. The pneumatic radial tire according to claim 6, wherein the thickness of the belt layer is 0.85 to 1.65 mm.

* * * * *